US009919354B2

(12) United States Patent
Everritt et al.

(10) Patent No.: US 9,919,354 B2
(45) Date of Patent: Mar. 20, 2018

(54) WIRE SCREEN MANUFACTURING SYSTEM AND METHOD

(71) Applicants: Steven Mark Everritt, Houston, TX (US); Carl Cooper, Houston, TX (US); Art Parmely, Houston, TX (US); Richard Grifno, Houston, TX (US)

(72) Inventors: Steven Mark Everritt, Houston, TX (US); Carl Cooper, Houston, TX (US); Art Parmely, Houston, TX (US); Richard Grifno, Houston, TX (US)

(73) Assignee: Delta Screen & Filtration, LLC, Houston, TX (US)

( * ) Notice: Subject to any disclaimer, the term of this patent is extended or adjusted under 35 U.S.C. 154(b) by 200 days.

(21) Appl. No.: 14/628,633

(22) Filed: Feb. 23, 2015

(65) Prior Publication Data

US 2015/0246385 A1    Sep. 3, 2015

Related U.S. Application Data

(60) Provisional application No. 61/946,266, filed on Feb. 28, 2014.

(51) Int. Cl.
| | |
|---|---|
| *B23K 11/00* | (2006.01) |
| *B21F 27/10* | (2006.01) |
| *B01D 39/10* | (2006.01) |
| *B21F 27/12* | (2006.01) |
| *B21F 27/18* | (2006.01) |

(52) U.S. Cl.
CPC ............. *B21F 27/10* (2013.01); *B01D 39/10* (2013.01); *B21F 27/124* (2013.01); *B21F 27/18* (2013.01); *B23K 11/008* (2013.01)

(58) Field of Classification Search
CPC ..................................................... B23K 11/06
USPC .......................................................... 228/4.1
See application file for complete search history.

(56) References Cited

U.S. PATENT DOCUMENTS

| | | |
|---|---|---|
| 3,090,896 A | 5/1963 | Bowden et al. |
| 3,427,518 A | 2/1969 | Cloup |
| 3,824,414 A | 7/1974 | Laithwaite et al. |
| 3,875,977 A | 4/1975 | Colburn et al. |
| 4,230,978 A | 10/1980 | Gardella, Jr. et al. |

(Continued)

OTHER PUBLICATIONS

PCT International Search Report, dated Jun. 2, 2015.
ISA Written Opinion, dated Jun. 2, 2015.

*Primary Examiner* — Erin B Saad
(74) *Attorney, Agent, or Firm* — Keeling Law, LLC; Kenneth A. Keeling; Mark S. Solomon (57) ABSTRACT

An exemplary embodiment of wire wrap welding system generally includes a headstock; a bed; a bed mounted tailstock linearly moveable in relation to the headstock; a linear induction drive system adapted to move the tailstock; a linear encoder system having a series of position encoders disposed on the bed; a servomotor adapted to rotate a headstock mounted spindle; a welding system positioned on the headstock, a servomotor positioned on the tailstock and adapted to rotate a tailstock mounted spindle; and a control system. An exemplary embodiment of a method for controlling slot openings between wire segments in a wire wrap welding process generally includes controlling movement of a bed mounted tailstock in relation to the rate of rotation of a headstock mounted spindle, utilizing a linear induction drive system, a linear encoder system, and a control system.

17 Claims, 5 Drawing Sheets

(56) References Cited

U.S. PATENT DOCUMENTS

| | | | |
|---|---|---|---|
| 4,459,727 A * | 7/1984 | Burton | B23P 19/04 |
| | | | 269/156 |
| 5,047,676 A * | 9/1991 | Ichikawa | B23Q 1/58 |
| | | | 310/12.19 |
| 5,665,254 A | 9/1997 | Isono et al. | |
| 7,281,319 B1 * | 10/2007 | Allford | B01D 29/111 |
| | | | 219/81 |
| 2004/0020033 A1 | 2/2004 | Neckoula | |
| 2005/0125980 A1 | 6/2005 | Rakow, Jr. et al. | |
| 2014/0034714 A1 | 2/2014 | Gatlin et al. | |
| 2014/0262155 A1 | 9/2014 | Miller | |
| 2015/0129580 A1 | 5/2015 | Miller et al. | |

* cited by examiner

WIRE SCREEN MANUFACTURING SYSTEM AND METHOD

CROSS-REFERENCE TO RELATED APPLICATIONS

This application claims the benefit of U.S. Provisional Application No. 61/946,266 filed on Feb. 28, 2014, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention relates to manufacture of wire screens for oil, gas, and water well pipe. More particularly, the present invention relates to a system and method for manufacturing wire screens for pipes.

Description of the Related Art

Hydrocarbons are produced by drilling into subterranean hydrocarbon-bearing formations. Unconsolidated formation walls can result in sand, rock, or silt accumulating in a wellbore, which can ultimately cause various problems in the drilling operation. Sand control has become increasingly important in the industry.

Well screens (also called filters) used in sand control applications can be of various types, including wire mesh and continuous slot, wire wrapped. Continuous slot, wire wrapped screens are composed of wire helically wrapped around multiple support ribs to form a cylindrical screen with a continuous helical slot there between. It is important that slot size (i.e., width between adjacent segments of the wrapped wire) is maintained within determined tolerances throughout the length of the screen.

Wire wrapped screens are typically manufactured using wire wrapping machines that simultaneously wrap the wire around, and weld the wire to, multiple support ribs, to form a hollow, cylindrical well screen of a desired length. A headstock spindle rotates the ribs causing wire to be wrapped around the set of ribs. Typically, a precision lead screw progresses the work piece laterally by driving the tailstock laterally away from the headstock. Rate of rotation of the headstock spindle in relation to advancement of the lead screw along the linear axis determines the dimensions of slot openings between adjacent wire segments.

Commercially utilized wire wrap screen machines incorporate computer based controls using servomotors for headstock spindle rotation. Typically, a servomotor with a precision ball screw controls linear movement of the driven tailstock. Alternative commercially utilized machines incorporate a helical gear rack for linear drive of the tailstock.

Some of the factors affecting the ability to maintain required slot spacing and tolerance are the relatively long sections of wire wrap screen necessary, and component wear over time. Wire wrap pipe screen sections may be greater than forty feet in length.

Linear induction drive technology has been previously described. See, for example, U.S. Pat. No. 3,824,414 issued to Laithwaite, et al., and U.S. Pat. No. 4,230,978 issued to Gardella, Jr., et al., both of which are incorporated herein by reference in their entirety to the extent not inconsistent herewith. Linear encoder technology has been previously described. See for example, U.S. Pat. No. 3,090,896 issued to Bowden, et al., and U.S. Pat. No. 3,427,518 issued to Cloup, both of which are incorporated herein by reference in their entirety to the extent not inconsistent herewith.

Embodiments of the present invention provide a wire wrap screen system having a linear induction drive system and a linear encoder system to controllably drive the tailstock, and a method for operating the wire wrap system.

BRIEF SUMMARY OF THE INVENTION

Embodiments of a wire wrap welding system and method for a wire wrapping system generally comprise providing a wire wrap system having a headstock; a bed; a tailstock, wherein the tailstock is mounted on the bed for linear movement in relation to the headstock; a linear induction drive system for controlled movement of the tailstock; a linear encoder system comprising a series of position encoders disposed on the bed; a servomotor for controlled rotation of a spindle on the headstock; a welding system positioned on the headstock; a servomotor positioned on the tailstock for controlled rotation of a spindle mounted on the tailstock; and a control system for controlled rotation of the headstock in relation to linear position of the tailstock.

Embodiments of a method for controlling wire slot openings using a wire wrap welding system general comprise controlling motion of a tailstock mounted on a bed in relation to a rate of rotation of a headstock spindle utilizing a linear induction drive system and a linear encoder system. Embodiments of the method further comprise controlling pressure applied to weld faying surfaces, and rate of rotation of a tailstock spindle.

BRIEF DESCRIPTION OF THE DRAWINGS

For a more complete understanding of embodiments of the invention, reference is now made to the following Detailed Description of Exemplary Embodiments of the Invention, taken in conjunction with the accompanying drawings, in which.

DETAILED DESCRIPTION OF EXEMPLARY EMBODIMENTS OF THE INVENTION

Figure 1:
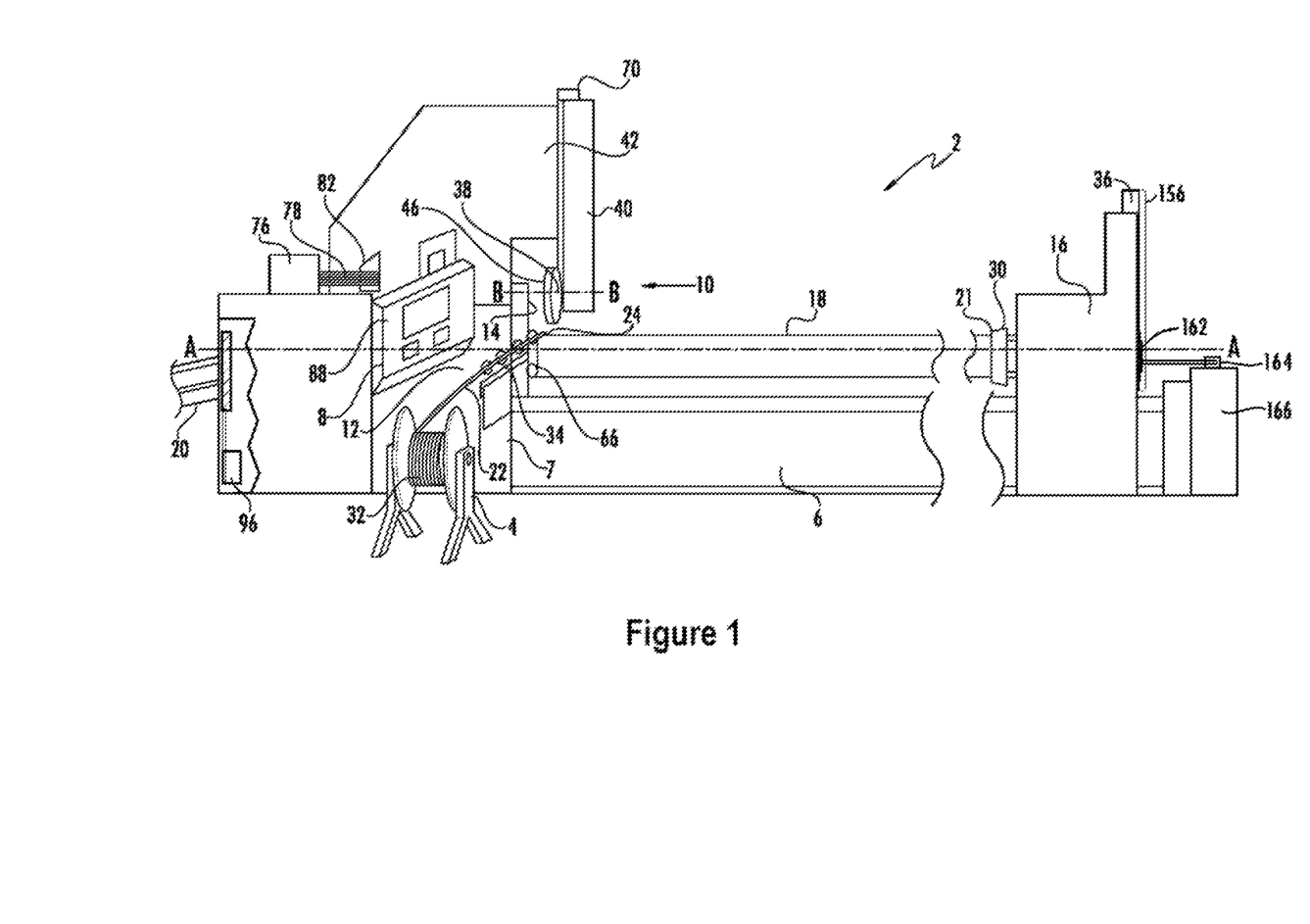
FIG. 1 is an illustrative view of an embodiment of a wire wrapping system of the present invention.

Referring now to the drawings, wherein like reference characters designate like or similar parts throughout, FIG. 1 depicts a wire wrapping system 2 having a welding pressure control assembly 10. Wire wrapping system 2 is used to manufacture wire wrapped well screens 18. Wire wrapping system 2 includes a wire feed assembly 4, bed 6, control module 8, welding pressure control assembly 10, headstock 12, rotating headstock spindle 14, and tailstock 16.

A plurality of elongated support ribs 20 and a wire 22 are used to form screen 18. Wire 22 is wrapped helically around the support ribs 20 and is welded at each contact point 24 of intersection between a rib 20 with wire 22. In this context, welding includes fusion welding, such as, but not limited to, electrical resistance welding. In an exemplary embodiment, welding is performed by a rotating welding wheel electrode 46 provided proximate headstock 12. The welding wheel electrode 46 welds wire 22 to corresponding ribs 20 at contact points 24 by electrical resistance welding.

Figure 2:
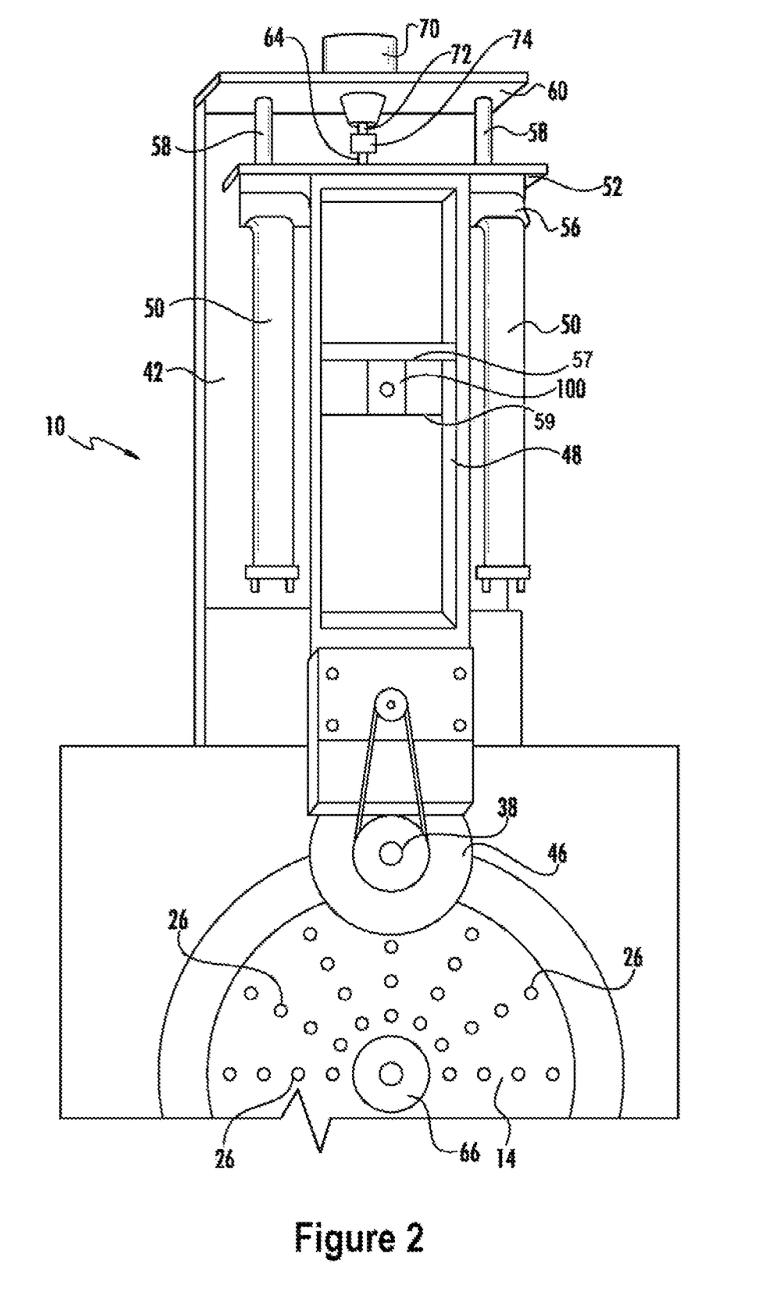
FIG. 2 is a partial view of an embodiment of a welding wheel assembly mounting structure of the present invention.

Headstock 12 is equipped with a rotating spindle 14. Spindle 14 rotates about axis A-A. Spindle 14 is driven by a rotary actuator, such as a servomotor or stepper motor, 96. Spindle 14 has a plurality of radially spaced rib openings 26 (shown in FIG. 2) through which ribs 20 extend. Rib openings 26 are spaced from spindle axis A-A at various distances and in various patterns to allow multiple circular patterns of rib openings 26.

Rib openings 26 allow ribs 20 to extend generally along axis A-A, but spaced therefrom prior to welding. Other supports (not shown) intermediate headstock 12 and tailstock 16 support ribs 20 substantially parallel to, and equally spaced from, axis A-A after welding, if a screen 18 is being formed without a pipe section disposed there within.

Figure 4:
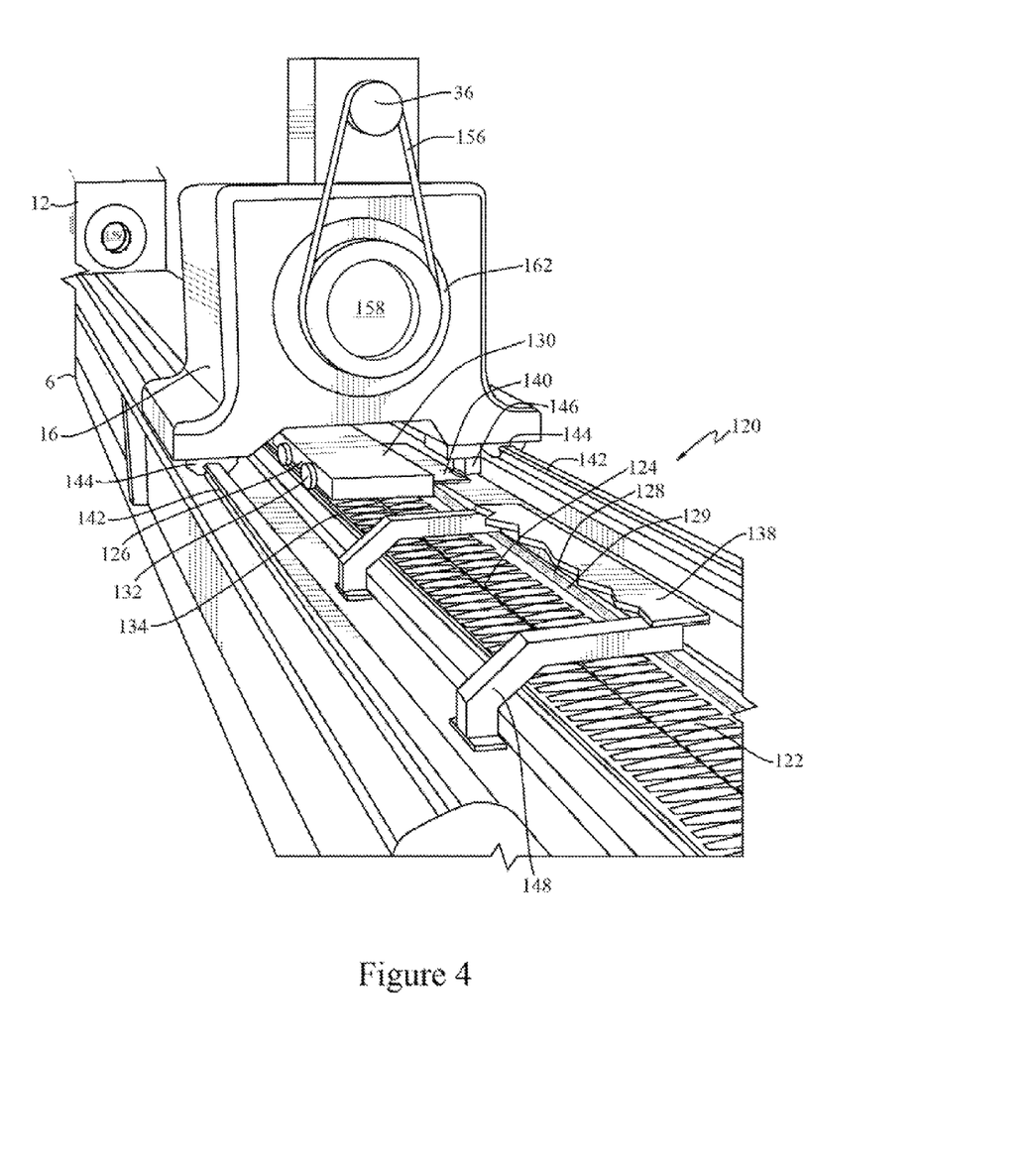
FIG. 4 is a partial view of a tailstock, a linear induction drive system, and a linear encoder system of an embodiment of the present invention.

Headstock 12 and tailstock 16 each have axial openings to allow pipe to be inserted axially along the bed 6 for applications wherein the wire screen is to be applied directly to a pipe section. Tailstock pipe opening 158 is depicted in FIG. 4. A like opening 159 is provided in headstock 12. When screen 18 is constructed on pipe, the grasping mechanism of tailstock 16 (not shown) is applied to the pipe.

Referring to FIG. 4, tailstock spindle 30 (not shown in FIG. 4) is driven to rotate about axis A-A by a rotary actuator, such as a servomotor or stepper motor, 36, connected to spindle drive assembly 162. In an exemplary embodiment, servomotor 96 is electronically connected to a processor 88 of a control module 8. Rate of rotation of spindle 14 may therefore be controlled by processor 88. Servomotor 36 is controlled to rotate tailstock spindle 30 at substantially the same rotation rate as headstock spindle 14. In an exemplary embodiment, servomotor 96 and servomotor 36 are each electronically connected to processor 88 and are each controllable by processor 88.

Figures 3, 3A:
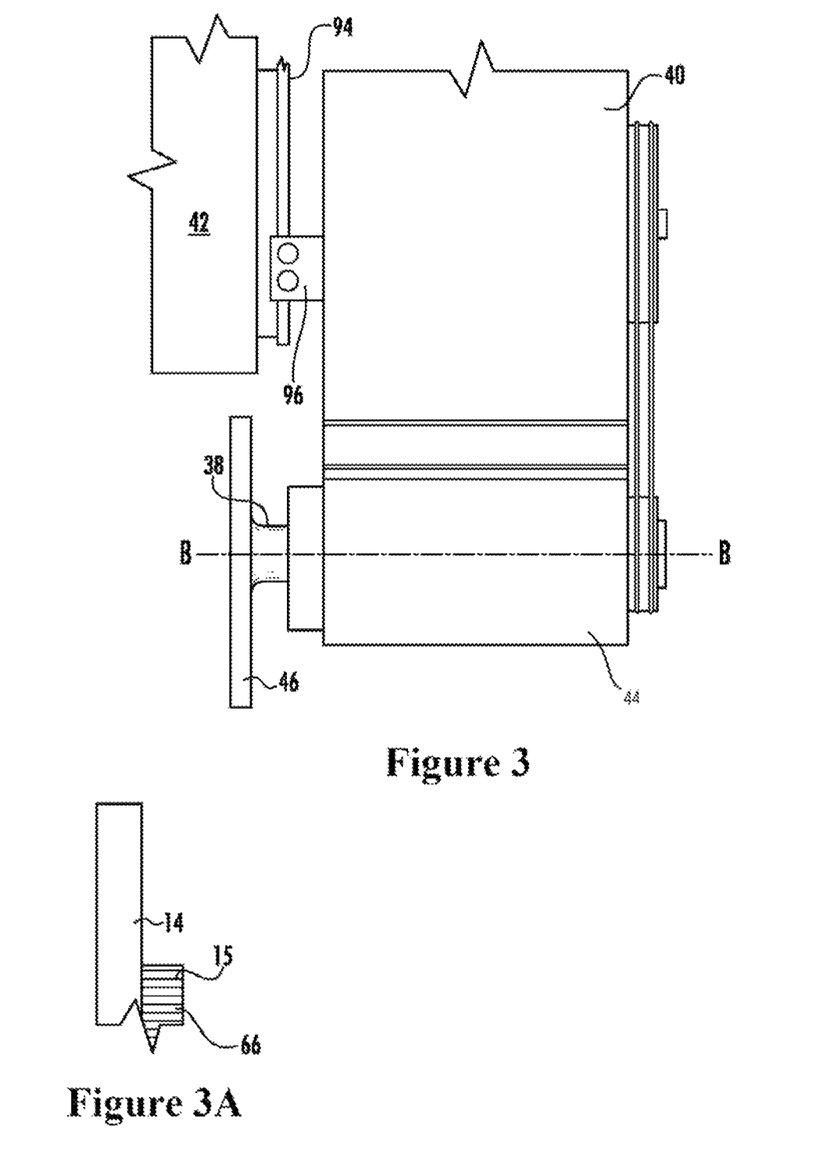
FIG. 3 is a partial side view of an embodiment of a welding support assembly and mounting structure of the present invention.
FIG. 3A is a partial side view of a rotating spindle of an embodiment of the present invention.

A head 66 is fixedly attached to spindle 14 and extends outward from spindle 14 in the direction of the tailstock 16. Head 66 is provided with cylindrical openings with milled longitudinal slots 15 (shown in FIG. 3A) sized and located to support ribs 20 and maintain rib 20 spacing. Head 66 serves as a support for ribs 20 and wire 22 during welding and comprises an element of the ground electrode of the welding process. Head 66 may be of differing sizes for different screen 18 diameters.

Headstock 12 is disposed proximate first bed end 7 of bed 6. Bed 6 is an elongate structure that extends along a longitudinal axis substantially parallel to, but offset from, axis A-A. Tailstock 16 is moveable along bed 6. In one embodiment, welding pressure control assembly 10 is located proximate first bed end 7 of bed 6. Welding pressure control assembly 10 comprises a welding arm 38, positioned on welding support assembly 40, moveably positioned above bed 6. As shown in detail in FIG. 2, a linear actuator, such as a servomotor or stepper motor, 70 is provided on a bracket 60 such that a motor shaft 72 extends vertically through bracket 60. A coupler 74 is mounted below bracket 60, connecting motor shaft 72 to a lead screw 64.

A force determination device, such as a load cell, 100 is provided in the welding pressure control assembly 10 to determine forces applied by the welding wheel electrode 46 to the wire 22 during a welding process. The load cell 100 is positioned intermediate a mounting structure 42 structure contact plate 57, and a support assembly 40 contact plate 59. In one embodiment, load cell 100 is a commercially available, precision compression loading type load cell. Specifically, load cell 100 measures pressure forces applied to load cell 100 by structure contact plate 57 and support contact plate 59.

In an exemplary embodiment, load cell 100 is electronically connected to processor 88 of control module 8 to provide continuous or intermittent communication of measured pressure forces. Accordingly, servomotor 70 may be operated in a closed loop process wherein load cell 100 measured forces are processed with feedback control of servomotor 70. Processor 88 control commands responsive to measured forces are provided pursuant to predetermined parameters to servomotor 70, thereby inducing operation of servomotor 70 to move support assembly 40 in relation to mounting structure 42 to increase or decrease applied force.

Welding wheel electrode 46 is supported in a fixed vertical orientation on support assembly 40 during a welding process. Spindle 14, on which head 66 is positioned, is in a fixed vertical position in relation to mounting structure 42. Accordingly, head 66, together with ribs 20 and wire 22 supported thereon, are positioned in a fixed vertical position in relation to mounting structure 42. Accordingly, for any given welding process, welding wheel electrode 46 may be positioned on the faying surfaces of ribs 20 and wire 22. Upon calibration, the applied pressure of welding wheel electrode 46 to faying surfaces of ribs 20 and wire 22 may be determined. Applied pressure may then be adjusted by relative movement of support assembly 40 in relation to mounting structure 42.

Cylinders 50, which in one aspect may be hydraulic and/or pneumatic, dampen the movement of support assembly 40 in relation to mounting structure 42, thereby allowing controlled pressure application with self-correcting, dampening adjustments for variations, such as variations resulting from rotation eccentricities of the welding wheel and spindle, welding wheel contact surface wear, and depth variations of faying surfaces.

In embodiments of the welding pressure control assembly 10 of the present invention which include a processor 88 in control module 8, force readings from load cell 100 are transmitted to processor 88. Processor 88 is programmable to operate servomotor 70 and accordingly adjust the position of support assembly 40 according to given conditions. Processor 88 is operable to, continually or intermittently, receive load data from load cell 100 and to adjust the vertical position of support assembly 40, via servomotor 70, to achieve a desired load level of welding wheel electrode 46 on wire 22. Such force level is indicated by load cell 100.

Tailstock 16 is controllably moveable along bed 6 by a linear induction drive system 120. Referring to FIG. 4, in one embodiment, linear induction drive system 120 comprises a plurality of stators 122 positioned along bed 6, collectively defining stator bed 124, and a motor assembly (not separately labeled) comprising at least one drive motor 126. Each stator 122 comprises a magnet (not shown). Drive motor 126 comprises motor coils (not shown) connected to a power source (not shown). In an exemplary embodiment, two or more drive motors 126, positioned in a motor housing 130, may be utilized. Guide rollers 132 are attached to both sides of motor housing 130. Guide rollers 132 allow motor housing 130 to roll linearly along bed 6 on roller tracks 134.

Roller tracks 134 are provided along bed 6 on each side of stator bed 124 and extend parallel to each other.

Drive motors 126 are arranged and structured in relation to stators 122 such that upon applying electrical power to motors 126, a magnetic field is generated, inducing movement of drive motors 126 along stators 122. In an exemplary embodiment, the relative positioning of drive motors 126 in relation to stator bed 124 is such that the gap between a lower edge of motor housing 130, and an upper surface of each respective stator 122, is substantially equal along stator bed 124. In an exemplary embodiment drive motors 126 are 480 volt, three-phase motors.

Referring to FIG. 4, two tailstock guide rails 142 are provided linearly along bed 6. Tailstock 16 guide rails 142 extend parallel to each other. Tailstock 16 is constructed with parallel races 144, each race 144 constructed to engage a corresponding guide rail 142. Bearings (not shown) are provided along each race 144 to facilitate low-friction travel of races 144 along guide rails 142.

Referring further to FIG. 4, a connector plate 140 is fixedly attached to each of motor housing 130 and an attachment bar 146 of tailstock 16. Accordingly, linear movement of motor housing 130 along stator bed 124 produces corresponding movement of tailstock 16 along guide rails 142. Tailstock races 144, guide rails 142, motor housing 130, guide rollers 132, and roller tracks 134 are structured, sized, and located such that the weight of tailstock 16 is substantially supported along guide rails 142, allowing relatively low-friction, linear movement of tailstock 16 along bed 6, and such that movement of the motor assembly comprising drive motors 126 along stator bed 124 produces corresponding movement of tailstock 16 along bed 6.

Still referring to FIG. 4, one or more cover supports 148 are provided to support a stator bed 124 cover 138 (cutaway view in FIG. 4). Cover 138, which may be replaceably removable, serves to keep undesired airborne materials away from stator bed 124.

In one embodiment, an encoder system (not separately labeled), such as a linear encoder system, utilizes a scale 128 for determination of linear position of tailstock 16 along bed 6. The linear encoder system may utilize optical, magnetic (active or passive), capacitive, inductive, eddy current, or other suitable technology. In one embodiment, scale 128 comprises a series of position encoders 129 positioned on bed 6. In one embodiment, the linear encoder system comprises one or more sensors (not shown), such as a transducer, which are adapted to wirelessly receive information from position encoders 129, to determine the location of tailstock 16 along bed 6. In one embodiment, the sensors are disposed within motor housing 130. In one embodiment, drives motors 126 may be equipped with one or more sensors. In one embodiment, the encoder system is electronically connected to processor 88 to allow for controlled movement of tailstock 16 along bed 6. In one embodiment, linear drive motors 126 are electronically connected to processor 88 to allow for control of motors 126 and, correspondingly, to control position of tailstock 16 along bed 6.

In embodiments of the present invention, a second drive system, such as drive motor 164, connected to tailstock 16 and positioned in a second motor assembly 166, may be utilized to move tailstock 16 along bed 6. In one embodiment, motor 164 utilizes a chain or belt drive to move tailstock 16 along bed 6. In one embodiment, second motor 164 is electronically connected to processor 88 to allow for controlled movement of tailstock 16 along bed 6. In one embodiment, either or both of motor 164 and linear drive motor(s) 126 may be utilized to move tailstock 16 along bed 6. In one embodiment, only linear motor 126 is initially utilized to move tailstock 16 along bed 6; however, if the load on one or more linear motors 126 reaches or exceeds a predetermined setting, motor 164 may be actuated to assist linear motor 126 in moving tailstock 16 along bed 6. In one embodiment, second motor 164 is controlled by processor 88 based at least partially on information obtained from position encoders 129 by the linear encoder system.

Referring again to FIG. 4, in an exemplary embodiment of the present invention, pipe opening 158 is provided in tailstock 16. Pipe opening 158 allows extension of a pipe section (not shown) to extend through tailstock 16. In such embodiment, ribs 20 are positioned proximate the pipe at headstock 12 in a commercially practiced, direct wrap method. In such application, an alternative tailstock spindle 30 is attached to the pipe section. Referring still to FIG. 4, servomotor 36 and drive belt 156 are also depicted for this embodiment. Motor 36 and drive belt 156 are operable to rotate spindle 30 by rotating spindle 30 drive assembly 162.

Operation

In operation, ribs 20 are extended through rib openings 26 and wire 22 is positioned on a rib 20. Each rib 20 and wire 22 comprises faying surfaces for welding by welding wheel electrode 46.

At the beginning of a welding process, welding wheel electrode 46 is positioned on wire 22. The indicated pressure forces applied to load cell 100 are determined. Servomotor 70 is operated to provide a load of support assembly 40 in relation to structure 42, thereby providing a determined load of welding wheel electrode 46 on faying surfaces of wire 22 and ribs 20. As welding wheel electrode 46 is fixedly attached to support assembly 40, and wire 22 and rib 20 faying surfaces supported on spindle 14 are in a vertically fixed orientation in relation to mounting structure 42, the load applied by welding wheel electrode 46 to wire 22 and rib 20 is also a determined force.

Pressure applied within air cylinders 50 is electronically controlled to maintain a determined cylinder pressure to offset at least a portion of the weight load of support assembly 40. Cylinder rods 58 are mounted on mounting structure 42, and cylinders 50 can be adjusted to provide a determined load on load cell 100 as load cell 100 measures load applied intermediate mounting structure 42 and support assembly 40. Accordingly, by application of appropriate dampening force by air cylinders 50, the indicated load at load cell 100 between structure contact plate 57 and support contact plate 59 can be set to a determined force as low as zero.

With the determined initial position, processor 88 is operated to control servomotor 70 to operate lead screw 64 to vertically bias support assembly 40 in relation to mounting structure 42 until a determined application load force is obtained. Load cell 100 indicates the load applied by welding wheel electrode 46 to the faying surfaces of wire 22 and ribs 20.

As spindle 14 of headstock 12 is rotated, and welding wheel electrode 46 is powered, the wire 22 is welded to successively rotated ribs 20. Rotation of spindle 14 results in wire 22 being drawn through a wire guide 34 from a spool 32 during a welding operation.

In one embodiment, a control system (not separately labeled), comprising processor 88 of control module 8, is operated during a welding process to rotate spindle 14, to control lateral movement of tailstock 16, and to control pressure applied by welding pressure control assembly 10 during the welding process. In an exemplary embodiment, processor 88 may be further utilized to control rotation of tailstock spindle 30.

Figure 5:
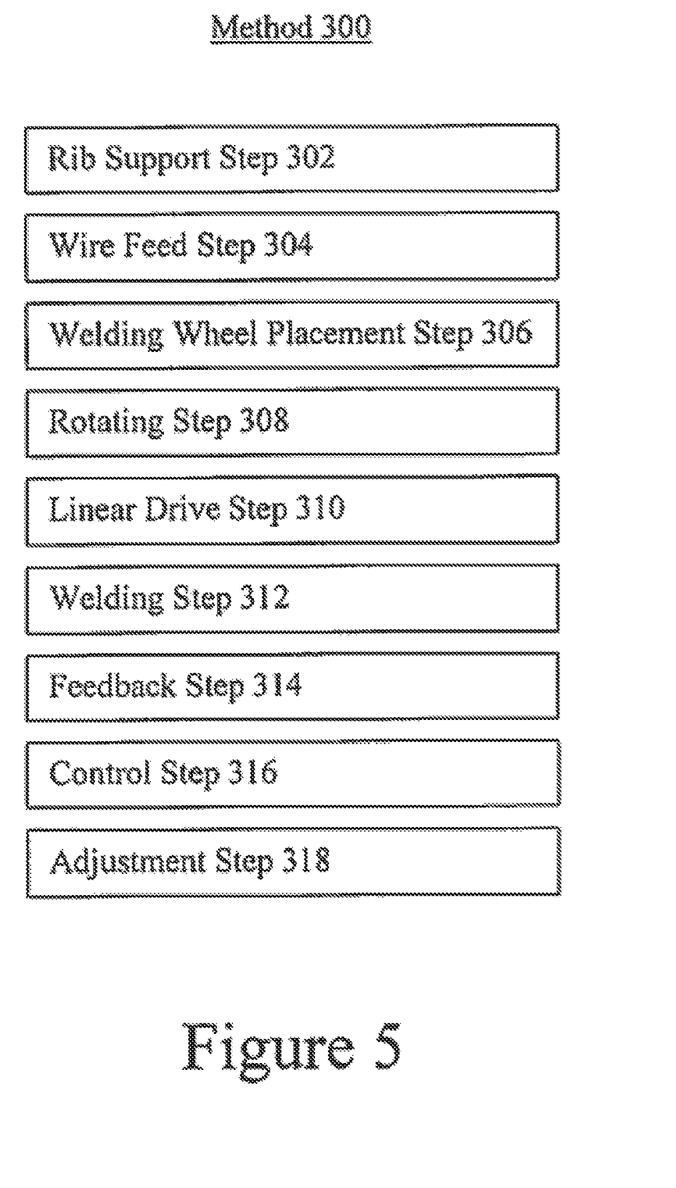
FIG. 5 depicts an embodiment of a method of the present invention.

Referring to FIG. 5, a method 300 depicting an embodiment of the present invention is disclosed for a wire wrap screen manufacturing process, the method comprising the steps indicated herein.

A rib support step 302 comprises providing a support for ribs 20, said support comprising a head 66.

A wire feed step 304 comprises providing wire 22 to an intersecting surface of a rib 20.

A welding wheel placement step 306 comprises providing a welding wheel electrode 46, supported on a support assembly 40, in contact with a wire 22 supported on a rib 20.

A rotating step 308 comprises rotating spindle 14.

A linear drive step 310 comprises driving tailstock 16 along axis A-A away from headstock 12 utilizing a linear induction drive system 120.

A welding step 312 comprises welding a wire 22 to a rib 20 at each intersection of wire 22 and rib 20.

A feedback step 314 comprises continuous or intermittent measurement of rotation speed of spindle 14 and location of tailstock 16.

A control step 316 comprises continuous or intermittent receipt of indicated welding wheel electrode 46 load data, processing the received data, and output of control commands according to predetermined parameters.

An adjustment step 318 comprises operation of induction linear drive motors 126 and control of the rotation speed of servomotor 96 to control rotation of spindle 14 as determined by operation parameters, to control spacing of wire 22.

As is known in the art, rotating step 308, linear drive step 310, and welding step 312 are generally performed substantially concurrently. In an embodiment of the present invention, feedback step 314 comprises continuously or intermittently measuring various data in relation to the wire wrapping system, including rotation speed of spindle 14, rotation speed of spindle 30, and linear travel of tailstock 16. In such an embodiment, control step 316 includes receipt of indicated load data and data related to spindle 14 rotation speed, spindle 30 rotation speed, and linear travel of tailstock 16; processing the data; and output of control commands according to predetermined parameters, and adjustment step 318 comprises adjustment of one or more of spindle 14 rotation speed, spindle 30 rotation speed, and linear movement of tailstock 16. More specifically, and as previously described, adjustment step 318 includes adjustment of the position of tailstock 16 at selected time intervals in relation to rotation of spindle 14, to obtain precise relative location of loops of wire 22 and slots formed between adjacent segments of wrapped wire 22.

While the preferred embodiments of the invention have been described and illustrated, modifications thereof can be made by one skilled in the art without departing from the teachings of the invention. Descriptions of embodiments are exemplary and not limiting. The extent and scope of the invention is set forth in the appended claims and is intended to extend to equivalents thereof. The claims are incorporated into the specification. Disclosure of existing patents, publications, and known art are incorporated herein to the extent required to provide reference details and understanding of the disclosure herein set forth.

We claim:

1. A manufacturing system for producing wire wrap screens for pipe comprising:
    a headstock comprising a spindle;
    a welding apparatus positioned on said headstock;
    a bed;
    a plurality of stators comprising magnets positioned along said bed;
    a tailstock positioned on said bed and comprising a spindle;
    a first rotary actuator that provides rotation of said headstock spindle;
    a second rotary actuator that provides rotation of said tailstock spindle; and
    a linear induction drive system that provides linear movement of said tailstock in relation to said headstock along said bed; wherein:
        said linear induction drive system comprises a motor assembly comprising at least one motor attached to said tailstock, wherein upon application of electrical power to at least one said motor, a magnetic field is generated between said motor and said magnets, thereby inducing linear movement of said motor, and therefore said tailstock, along said bed.

2. The manufacturing system of claim 1, comprising:
    a linear encoder system;
    wherein:
        said linear encoder system determines a location of said tailstock in relation to said headstock along said bed, based at least in part, on information provided, directly or indirectly, to said linear encoder system by at least one of a plurality of position encoders disposed on a scale along said bed.

3. The manufacturing system of claim 1, wherein said linear induction drive system comprises:
    one or more roller tracks positioned on said bed; and
    one or more guide rollers, wherein each guide roller cooperates with one of said roller tracks to provide rolling movement of said motor assembly in relation to said headstock along said bed.

4. The manufacturing system of claim 1, wherein:
    said bed comprises one or more guide rails;
    said tailstock comprises one or more races comprising at least one bearing; and
    each race cooperates with one of said guide rails to provide low-friction movement of said tailstock in relation to said headstock along said bed.

5. The manufacturing system of claim 1, comprising an additional, non-induction drive system that assists in providing linear movement of said tailstock in relation to said headstock along said bed.

6. The manufacturing system of claim 2, comprising a control system to control:
    rotation of said headstock spindle;
    rotation of said tailstock spindle;
    linear movement of said tailstock in relation to said headstock along said bed by said linear induction drive system; and
    determination of said location of said tailstock in relation to said headstock along said bed by said linear encoder system.

7. The manufacturing system of claim 2, wherein said linear encoder system determines said location of said tailstock in relation to said headstock along said bed, based at least in part, on information provided wirelessly, directly or indirectly, to said linear encoder system, by at least one of said plurality of position encoders disposed along said bed.

8. The manufacturing system of claim 5, wherein said additional, non-linear, drive system assists in providing linear movement of said tailstock in relation to said headstock along said bed only if a load on said linear induction drive system reaches or exceeds a predetermined setting.

9. The manufacturing system of claim 2, comprising:
a control system to control determination of said location of said tailstock in relation to said headstock along said bed by said linear encoder system.

10. The manufacturing system of claim 2, wherein:
said information is provided by said at least one of said plurality of position encoders in at least one form selected from the group consisting of:
optical;
magnetic;
capacitive;
inductive; and
eddy current.

11. The manufacturing system of claim 7, comprising one or more sensors to receive said wirelessly provided information to determine said location of said tailstock in relation to said headstock along said bed.

12. A method for producing a wire wrapped screen comprising:
providing the manufacturing system of claim 1; and
operating said manufacturing system to produce said wire wrap screens, wherein:
said linear induction drive system provides linear movement of said tailstock in relation to said headstock along said bed by application of electrical power to at least one said motor.

13. The method of claim 12, comprising utilizing an additional, non-induction drive system to assist said linear induction drive system in providing linear movement of said tailstock in relation to said headstock along said bed.

14. The method of claim 13, wherein utilizing said additional, non-induction drive system comprises operating said additional, non-induction drive system only if a load on said linear induction drive system reaches or exceeds a predetermined setting.

15. The method of claim 12, comprising utilizing a linear encoder system to determine a relative location of said tailstock in relation to said headstock along said bed, based at least in part, on information provided, directly or indirectly, to said linear encoder system, by at least one of a plurality of position encoders disposed on a scale along said bed.

16. The method of claim 15, comprising wirelessly providing said information from at least one of said plurality of position encoders to said linear encoder system.

17. The method of claim 15, comprising the steps of:
providing a support for a plurality of ribs;
providing a wire to intersect each said rib;
providing a welding wheel, supported on a support assembly, in contact with said wire at a point of intersection between said wire and one said rib;
rotating said headstock spindle;
moving said tailstock away from said headstock;
welding said wire to said one said rib at said point of intersection;
obtaining measurements, continuously or intermittently, of a location of said tailstock in relation to said headstock along said bed utilizing said linear encoder system; and
utilizing a control system to control, based at least in part on said obtained measurements, the width of slot openings between wire segments of said wire wrapped screen.

* * * * *